United States Patent [19]

Whitfield et al.

[11] 4,231,433
[45] Nov. 4, 1980

[54] CULTIVATOR WITH TOOL SUPPORT ARM AND LATCH FOR HOLDING SAME IN RAISED NON-WORKING POSITION

[75] Inventors: Carroll J. Whitfield; Anthony W. Lastinger, both of Tifton, Ga.

[73] Assignee: Kelley Manufacturing Co., Tifton, Ga.

[21] Appl. No.: 941,067

[22] Filed: Sep. 11, 1978

[51] Int. Cl.³ ............................................. A01B 65/06
[52] U.S. Cl. .................................... 172/662; 172/190; 172/430; 172/551; 172/573; 172/603; 172/657
[58] Field of Search ............... 172/198, 269, 540, 544, 172/551, 555, 572, 573, 624, 626, 627, 657, 662, 681, 683, 705, 711, 739, 740, 762, 763, 776, 190, 462, 481, 603; 292/87, 88, 89, 80; 403/66, 69, 70, 75, 79, 92, 191

[56] References Cited

U.S. PATENT DOCUMENTS

| | | | |
|---|---|---|---|
| 43,207 | 6/1864 | Hendee | 172/657 |
| 239,267 | 3/1881 | Niedomanski | 292/87 |
| 1,062,733 | 5/1913 | Rahotina | 292/87 |
| 2,240,923 | 5/1941 | Christie | 292/87 |
| 3,500,936 | 3/1970 | Vigen | 172/198 |
| 4,102,406 | 7/1978 | Orthman | 172/540 |

*Primary Examiner*—Richard T. Stouffer
*Attorney, Agent, or Firm*—Jennings, Carter & Thompson

[57] ABSTRACT

Closely spaced cultivating tools are mounted along a tool bar and each tool may be locked in a raised position relative to the ground or may be lowered into floating engagement with the ground during use of the implement. A small tool bar is mounted parallel to a larger tool bar and the cultivating tools are slidably clamped on the small tool bar. Improved mounting structure allows each cultivating tool to be mounted on the small tool bar without having to slide each cultivating tool onto or off of the tool bar from the ends of the tool bar and without having to disassemble the mounting structure. The tool bar assembly includes row indicia for indicating where the tools are to be located along the tool bar and which tools should engage the ground and which tools should be raised away from the ground for various cultivating operations on row crops. A tool angling mechanism allows selective adjustment of the angle to the line of draft of each tool without the use of wrenches or other hand tools.

1 Claim, 6 Drawing Figures

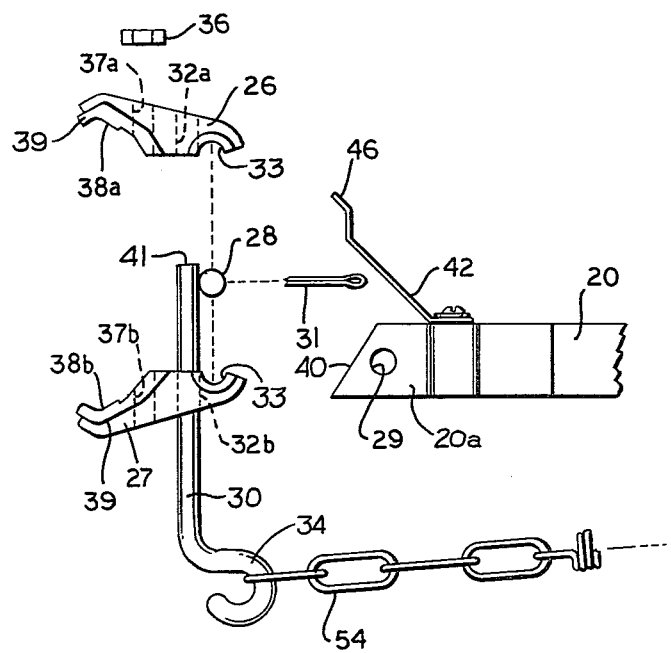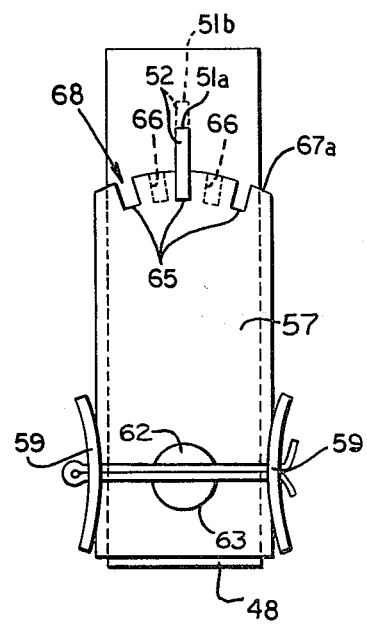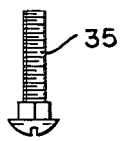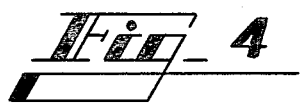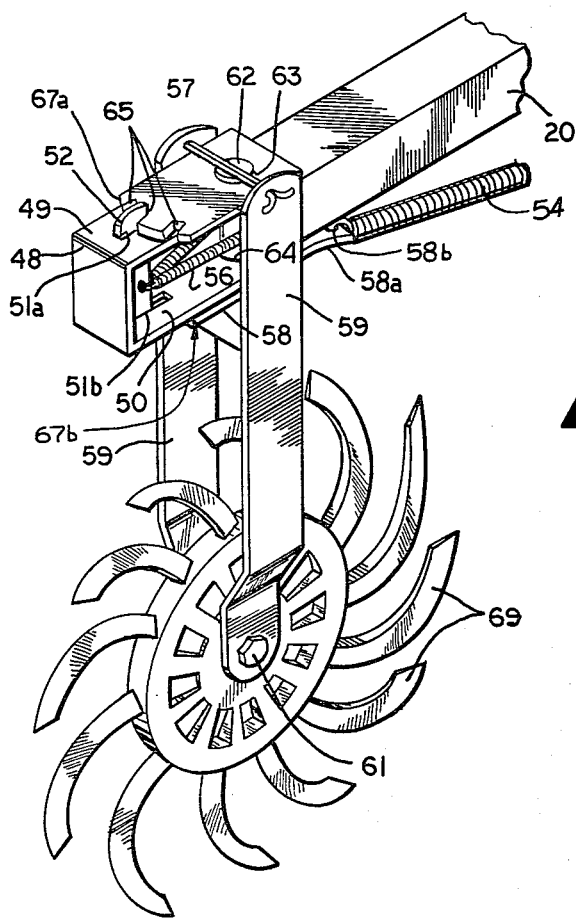

CULTIVATOR WITH TOOL SUPPORT ARM AND LATCH FOR HOLDING SAME IN RAISED NON-WORKING POSITION

BACKGROUND OF THE INVENTION

This invention relates to cultivators of the type which include a plurality of tools that engage and till the soil.

The prior art includes a wide variety of cultivating implements designed for both pre-planting use and for cultivating at various stages of crop growth. Many prior art implements, commonly called "rotary hoes", were designed to cover large areas of a field with closely spaced rotary tools. The prior art also discloses a variety of cultivating implements having multiple rotary tools, each of which may be angled with respect to the line of draft of the implement.

One such example of a prior art implement is shown in U.S. Pat. No. 1,249,008 to W. P. Bonds, Jr. The implement shown in the Bonds patent has a plurality of laterally spaced rotary ground engaging tools suspended from a transverse bar with means for simultaneously raising all of the tools away from the ground and a spring assembly for individually urging each of the tools down into the ground. Bonds also discloses structure which enables the tools to be selectively angled with respect to the line of draft of the implement by means of a collar and shaft arrangement for each rotary tool and a set screw which extends through the collar and can be brought into engagement with the shaft.

The disadvantages of most of the prior art adjustable implements include the necessity for using a wrench or other hand tool when adjusting the angle of draft of each ground engaging tool, that the rotary tools are raised or lowered from the ground in unison, that a visual aid such as a protractor is required for accurately setting the angle of draft of the rotary tool, that some type of external measuring device is required for accurate placement of various tools along the length of a tool bar when assembling the implement, and that certain ones of the tools already mounted on a tool bar must be removed from the tool bar when it is desired that certain portions of the width of the implement be free from ground engaging tools as when cultivating about growing crops, etc.

SUMMARY OF THE INVENTION

Briefly described, the invention disclosed herein comprises a cultivator which includes a plurality of ground engaging tools, with each tool preferably including a rotary spider that rotatably engages the ground for the purpose of cultivating the soil prior to and after a crop emergence. The spider of each tool is anglable with respect to the draft of the implement so that the spider may run straight through the soil or comb through the soil and throw dirt to one side or the other of the tool. Each tool is individually mounted on the tool bar, and each tool may float in the ground or be raised up from the ground and locked in its up position. The implement is constructed so that the angling of the spiders and the raising of the tools to their inactive positions can be accomplished without the use of hand tools, and the spiders can be placed at various predetermined angles with respect to the line of draft of the implement.

A second small tool bar is rigidly fixed to a larger conventional tool bar in such a manner that a clamp of one of the ground engaging mounts on the second tool bar and is slidable along the length thereof without encountering any obstruction. The tool bar assembly on which the tools are mounted has a variety of distinct indicia disposed along its length for indicating the proper location of tools relative to drill lines of the crops for use with crops of various row spacings. The indicia include symbols corresponding to a particular row spacing and indicate at what locations along the tool bar the tools should be located for particular crop row spacing. The location of a plurality of these symbols along the bar allows the user to set up and use the implement for various row spacing for different crops without resorting to external measuring means.

The present invention also includes a clamp assembly for each ground engaging tool which is constructed to be attached to the second, smaller tool bar. The combination of the clamp and the improved tool bar assembly allows the tool support arm of each ground engaging tool to be mounted directly to the smaller tool bar without sliding the tool onto the tool bar from the end of the tool bar. Furthermore when the jaws of the clamp are opened for placing them over the smaller tool bar, the clamp assembly maintains its integrity and the clamp assembly does not have to be disassembled in order to mount and dismount the ground engaging tool to the tool bar.

The tool support arm of each ground engaging tool may be individually locked in raised position by means of a leaf spring having an opening therein which automatically engages a locking post of the clamp assembly when the tool support arm is raised to a predetermined position. To lower the tool support arm, the operator lifts the free end of the tool support arm and disengages the leaf spring from the locking post. This allows each tool to be raised to and lowered from a locked position without the use of wrenches or other hand tools. When changing from one cultivating operation to another, the combination of the simple means for holding the individual tools up away from the ground in a locked position and the row indicia on the tool bar allow the user quickly to determine which tool should be raised to the locked position and to raise them by hand.

Each ground engaging tool may be individually angled by the novel angling means of the present invention. The axles of the individual rotary tools are supported at the lower ends of a pair of shank members and the shank members are attached at their upper ends to a pair of upper and lower parallel quadrant plates. The quadrant plates fit over a box-like member mounted on the tool support arm and a pivot shaft extends vertically through at least one quadrant plate and a box member. A plurality of notches is provided in the upper and lower quadrant plates. The notches are disposed on the edges of the plates facing away from said pivot shaft. The box member is fitted with a movable detent or tongue member and a spring urges said tongue member toward the pivot shaft and the notches of the quadrant plate, thus locking the shank members, and hence the rotary spider at the lower ends of the shank members, at a predetermined angle to the forward direction of travel of the implement. Thus, the operator of the implement may change the angle of each tool in the field merely by pulling back on the tongue member and rotating the rotary spider about a vertical axis until the spider is disposed at one of the predetermined angles with respect to the line of draft of the implement. By releasing the tongue member for engagement of the notch at that angle the parts are locked in selected position. Therefore the present invention provides a means of adjusting the angle of each tool with respect to the line of draft of the implement without the use of tools.

It is an object of this invention to provide an improved tool bar and indicia means which simplify and expedite the location of cultivator tools on the tool bar.

It is also an object of this invention to provide an improved mounting means for mounting cultivating tools to a tool bar of a farm implement.

It is a further object of this invention to provide an improved support structure for ground engaging tools of a cultivator which permits the tools to engage the ground with a floating action for cultivating crops or which permits the tools to be raised up and locked away from engagement with the ground.

It is a further object of this invention to provide a rotary cultivator with a plurality of rotatable ground engaging tools and with an improved means for expediently setting each ground engaging tool at any of several predetermined angles with respect to the line of draft of the implement without the necessity of visual alignment aids and without the use of hand tools such as wrenches.

Another object of this invention is to provide a cultivating implement which includes a plurality of rotatable ground engaging tools which independently swing about an axis transverse to the direction of movement of the implement and which includes means for expediently raising and locking the tools and means for expediently angling the tools with respect to the direction of movement of the implement.

These and other objects and improvements over the prior art provided by the present invention will be understood from the description of the preferred embodiment which follows.

BRIEF DESCRIPTION OF THE DRAWINGS

FIG. 4 is an exploded side view of the clamp assembly which hold each tool support arm to the tool bar.

FIG. 5 is a top view of the angling means.

FIG. 6 is a perspective view of the angling means.

DETAILED DESCRIPTION OF THE PREFERRED EMBODIMENT

Figure 1:
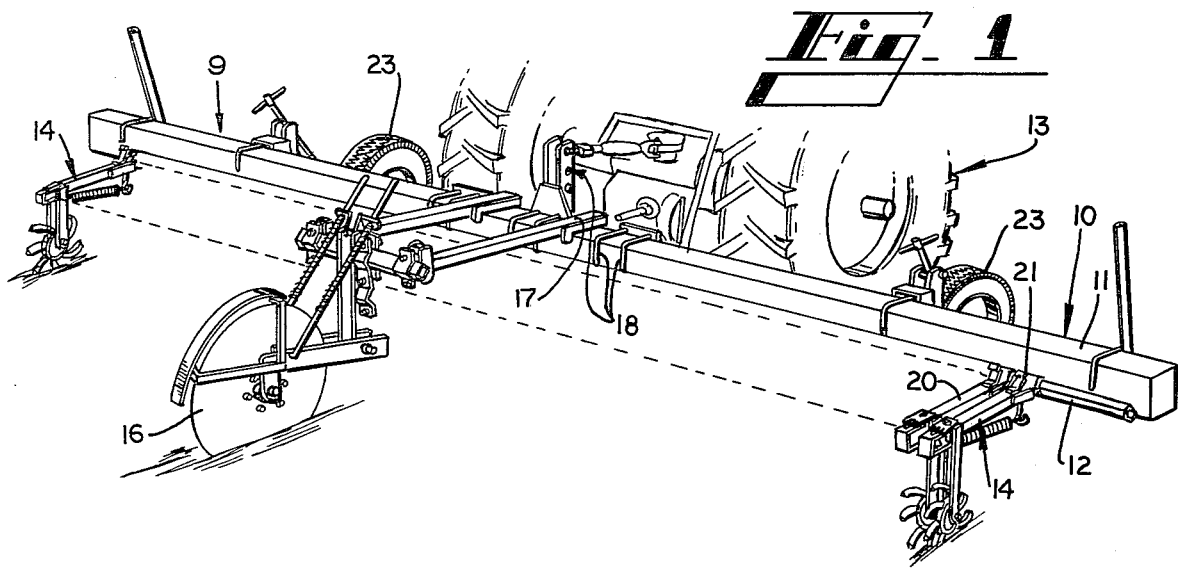
FIG. 1 is a perspective view of the cultivating implement.

Referring in more detail to the drawings, in which like numerals refer to like parts throughout the several views, FIG. 1 illustrates the cultivating implement 9 which includes a tool bar assembly 10 which is attached to the rear of a tractor 13 with a conventional three point hitch 18. The tool bar assembly 10 extends transversely to the normal direction of travel of the tractor 13. Tool bar assembly 10 comprises a conventional horizontal tool bar 11 and a second, smaller tool bar 12 rigidly attached thereto in spaced, parallel relationship behind the tool bar 11. A coulter 16 is mounted on tool bar 11 by hitch 17 and extends rearwardly behind the tractor 13 and cultivator implement 9 for the purpose of stabilizing the implement as the tractor pulls the implement through the field. Gauge wheels 23, mounted on the tool bar 11, hold the implement 9 at a predetermined height above the ground surface.

Figure 2:
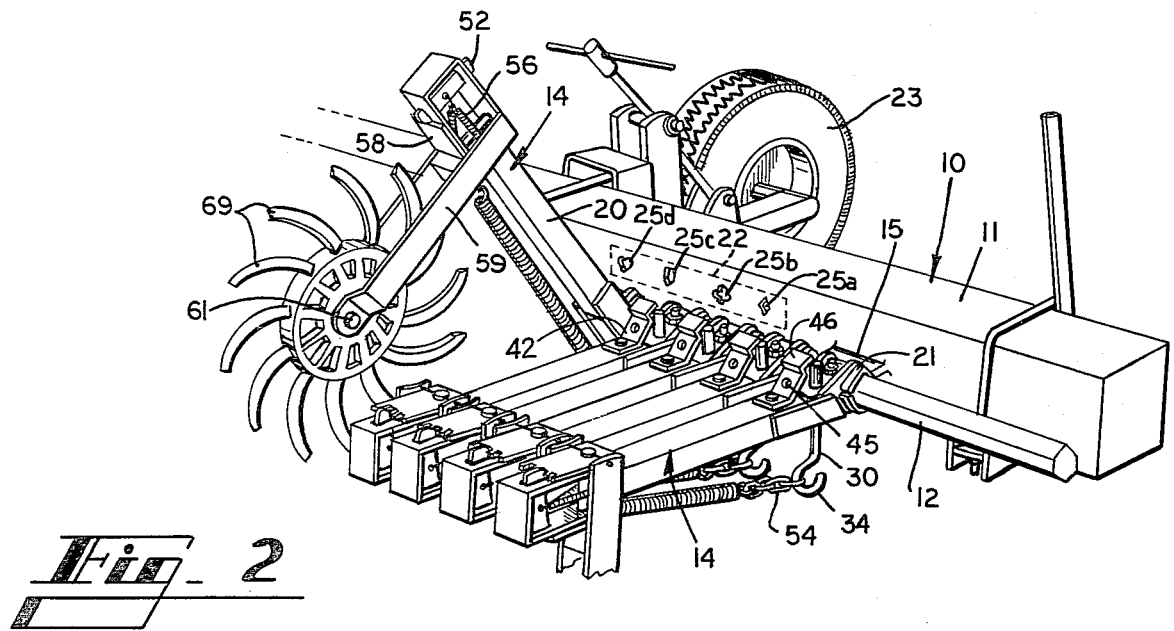
FIG. 2 is a partial perspective view of the present invention, showing one of the cultivating tools in its raised and locked position.
Figure 3:
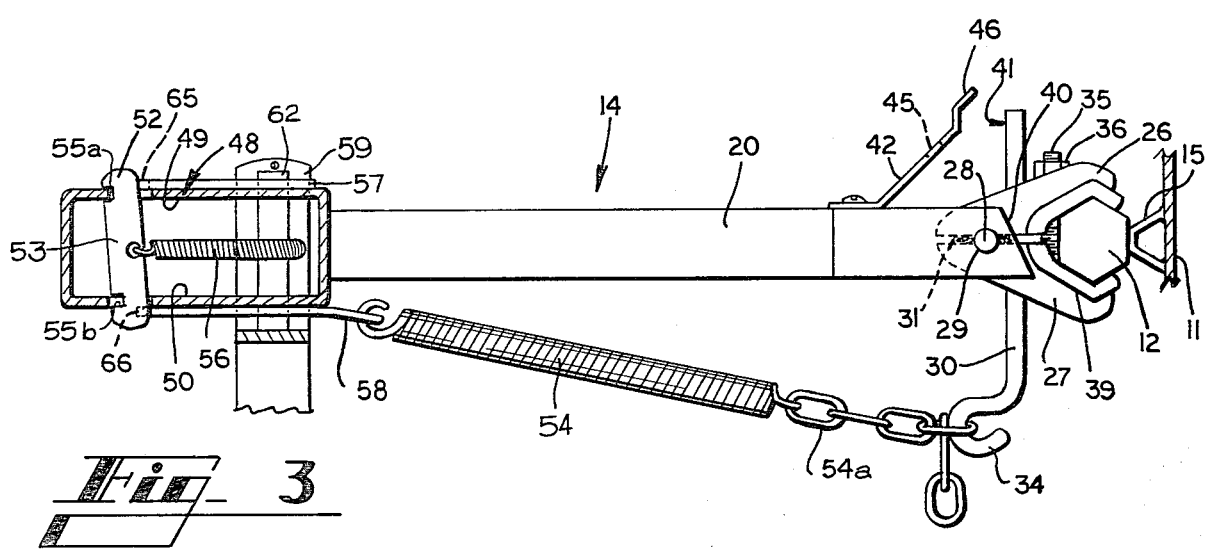
FIG. 3 is a side view of the tool support arm with a portion broken away, the box member showing the locking means, and the jaw members of the tool bar clamp.

As illustrated in FIGS. 2 and 3, tool bar assembly 10 includes second tool bar 12 which is hexagonal in cross section, having a cross sectional area substantially smaller than that of larger tool bar 11. Second tool bar is fixedly connected to tool bar 11 by means of a plurality of braces 15 welded at intervals along the lengths of the tool bars. There is a plurality of cultivating tools 14 distributed along the tool bar assembly 10, and each cultivating tool 14 includes a clamp assembly 21, a tool support arm 20, and a pair of shank members 59 which extend down adjacent the free end of the tool support arm. A spider or other type rotary ground engaging tool 69 is rotatably mounted at the lower ends of the shank members.

The clamp assembly 21 of each cultivating tool 14 is approximately C-shaped and is slidable along the length of second tool bar 12 without being obstructed by any of the braces 15 which mount the second tool bar 12 to the larger tool bar 11. Thus, it can be seen that the tool bar assembly 10 allows clamp assembly 21 to be moved along the entire length of the bar without regard to location of hitches such as tractor hitch 18 or coulter hitch 17 which extend only about tool bar 11.

As illustrated in FIG. 4, clamp assembly 21 includes upper jaw member 26, lower jaw member 27 and pivot pin 28. The upper and lower jaw members are of identical construction and include clamp surfaces 38a and 38b which correspond in size and shape to the size and shape of tool bar 12, holes 32a and 32b for receiving hook post 30, semi-cylindrical pin surfaces 33 for projecting about pivot pin 28, and holes 37a and 37b for accepting the bolt 35. A tool support is provided with spaced, forwardly extending plates 20a having pivot openings 29 near the forward ends thereof for accepting pivot pin 28. Hook post 30 extends through holes 32a and 32b and hook post 30 is secured to pivot pin 28 by cotter pin 31. The lower end of post 30 is provided with a hook 34 the opening of which is forwardly directed. Jaw member 27 is assembled on the post 30. By inserting pivot pin 28 through openings 29 of support arm 20 and then attaching hook post 30 to pin 28 with cotter pin 31, the combination of the tool support arm 20, pivot pin 28, and hook post 30 become a working unit.

After the jaw member has been inserted onto the hook post, bolt 35 is passed through holes 37a and 37b and a nut 36 is screwed down the bolt until the semi-cylindrical pin surfaces 33 of the jaw members clamp about pivot pin 28. This assembles the entire clamp assembly comprising jaw members 26 and 27, pivot pin 28, cotter pin 31, and hook post 30 into an operable unit. Also, when the jaw members are placed about the tool bar 12 and nut 36 run down on bolt 35, clamp assembly 21 is rigidly secured to the tool bar 12, holding pin 28 parallel to tool bar 12. When the nut 36 is loosened, the clamp assembly may be moved along the length of tool bar 12. Bolt 35 is of such a length that nut 36 may remain on the threaded portion thereof while permitting jaw members 36 and 27 to separate enough that they may be slipped over tool bar 12, thus permitting assembly without dismantling the clamp assembly. Bolt 35 and its nut 36 thus serve as adjustable closing means for jaw members 26 and 27.

As illustrated in FIG. 3, jaw members 26 and 27 of each clamp assembly 21 include pads 39 adjacent their clamp surfaces 38a and 38b which protrude from both sides of the jaw members. As will be recalled, tool support arm 20, which is preferably a hollow tube of square cross section, is pivotally mounted to the clamp assembly 21 by pivot pin 28 so that it swings about an axis parallel to tool bar 12. The ends of plates 20a have beveled end surfaces 40 disposed to engage the side protrusions 39 of lower jaw member 27 as the tool arm swings about pivot pin 28 a predetermined distance downwardly toward the ground. Moreover, the angle of the beveled ends 40 is such that the tool support arm 20 to be swung upwardly more than 90° before the beveled surfaces 40 engage the pad 30 of the upper jaw member 26. Thus, the pads 39 of the upper and lower jaw members 26 and 27 function as stop members with respect to tool support arm 20 so that the tool arm can be moved to its up, locked position (as is explained hereinbelow), or can float upwardly to follow the contour of the ground and to clear normally encountered obstructions on the ground. However, when the tool bar assembly 10 is lifted by the tractor, the tool support arms swing downwardly with respect to the tool bar assembly through only a short arc before the stop surfaces limit further downward movement, whereby the cultivating tools 14 are suspended rearwardly from the tool bar assembly 10. Thus, each cultivating tool 14 floats freely about tool bar 12 when the cultivating tools attached thereto engage the ground, but the cultivating tools can be raised and locked in a position away from the ground for transporting the implement over areas in which cultivation is not desired, such as over a roadway.

As illustrated in FIGS. 3 and 4, each tool support arm 20 has a leaf spring 42 fixedly secured to the upper surface thereof. A hole 45 is formed in the spring 42. The configuration of the leaf spring 42 is such that when the tool arm pivots upwardly to the position of FIG. 2, the spring engages and rides up on the uppermost protruding end 41 of hook post 30, until the hole 45 registers with the upper protruding end 41. In this position the leaf spring snaps down about the upper end of the hook post 30, holding the arm in raised position.

To disengage the spring latching means, the tool carrying end of arm 20 is raised slightly, and the free end of leaf spring 42, which forms a handle 46, is pulled upwardly disengaging the spring from the upper end 41 of hook post 30. The cultivating tool 14 then falls by gravity to its normal ground engaging position.

While we show as a preferred ground working implement a slicer tine spider 69 of the type described in U.S. Pat. No. 3,766,988 to Whitsides, various other rotary ground engaging tools such as discs, notched discs, or rotary hoes may be used. Non-rotating tools such as sweeps and shovels may be substituted for the rotary tools.

As illustrated in FIGS. 3, 5 and 6, the rear end of each tool support arm 20 carries a box member 48 which includes upper and lower parallel plates 49 and 50, respectively. As best illustrated in FIG. 6, upper and lower parallel plates 49 and 50 are provided with elongated slots 51a and 51b respectively. A tongue member 52 of a length greater than the distance between upper and lower parallel plates 49 and 50 extends through both slots 51a and 51b. Member 52 has notches 55a and 55b therein. Member 52 is urged toward the forward end of box member 48 by spring 56.

Fitted over box member 48 is an assembly comprising upper quadrant plate 57, lower quadrant plate 58, and a pair of tool shank members 59 rigidly attached to the opposite edges of the quadrant plates. Upper and lower quadrant plates 57 and 58 are parallel to each other and are parallel to the upper and lower plates 49 and 50 of box member 48. Shank members 59 extend downwardly from the quadrant plates the proper distance to support the spider 69. The spider 69 or other ground engaging tool is mounted on an axle 61 extending between the lower ends of members 59. The forward end portion 58a of lower quadrant plate 58 extends beyond box member 48, and hole 58b is formed in the extension. Tension spring 54 is connected at its ends to the hole 58b of lower quadrant plate 58 and to the tension adjusting chain 54a which is connected to hook 34 of hook post 30, thus to bias the cultivator tool 14 down into the soil.

Vertically aligned openings 63 are formed in quadrant plates 57 and 58. Similar aligned openings 64 are formed in upper and lower parallel plates 49 and 50 of box member 48. Extending through these openings is a pivot pin 62, thus mounting the quadrant plates 57 and 58 and shank members 59 for rotation with respect to box member 48. Since box member 48 is rigidly secured to tool support arm 29, it can be seen that this arrangement allows the angling of shank members 59 and hence the angling of the cultivating tool 69 with respect to the longitudinal axis of tool support arm 20 and therefore with respect to the line of draft of the implement.

As illustrated in FIGS. 5 and 6, a series of spaced upper notches 65 is formed in the rear edge of upper quadrant plate 57. Similarly a series of spaced lower notches 66 is formed in the rear edge of lower quadrant plate 58. Both sets of notches extend radially from the center of pivot pin 62. The set of upper notches 65 lie at different angles to the longitudinal axis of tool support arm 20 than do lower notches 66, so that the upper notches 57 are angularly offset from lower notches 58. Thus, with the use of two quadrant plates 57 and 58 instead of one, the number of useable notches in quadrant plates 57 and 58 is increased while the width of metal lying between adjacent notches is such that the material has enough strength to maintain the setting of the cultivating tool 69.

Tongue member 52 is provided with a hole 53 intermediate its ends and receives both ends of a spring 56 which is wrapped around pivot pin 62. This causes tongue member 52 to be constantly biased toward the front of box member 48 so that the un-notched edges of the tongue member 52 are biased toward the notched edges of the upper and lower plates 57 and 58. When the tongue is pulled against the bias of spring 56 to the rear of slots 51a and 51b notches 55a and 55b register with the facing end of slots 51a and 51b as the leading, un-notched edges are withdrawn from the quadrant notches 65 and 66. With tongue member 52 held in this position, the rear edges 67a and 67b of quadrant plates 57 and 58 clear the forward edge of tongue member 52 and the quadrant plate assembly may be rotated about pivot pin 62. The operator may then select the angle at which he wants the cultivating tool 69 to run with respect to the line of draft of the implement. For example, with the parts set to utilize notch 68, a setting of 10° right is obtained. Engaging the tongue in this notch locks the ground-engaging tool 69 angled at 10° right to the line of draft of the implement. As may be seen from FIG. 5, when tongue member 52 is registered in one of the upper notches 65, the lower forward edge of tongue member 52 is urged against the rear edge 67b of lower quadrant plate 58. Likewise when tongue member 52 is registered in one of the lower notches 66, the upper forward edge of tongue member 52 is urged against a portion of edge 67*a* of upper quadrant plate 57.

From the foregoing it will be seen that the operator of a cultivating implement embodying the present invention may quickly set the tool working angle relative to the line of draft without the use of wrenches or other hand tools.

As illustrated in FIG. 2, the tool bar assembly 10 includes indicia 22 which are distributed along tool bar 11. The indicia 22 comprise various distinct symbols such as a series of arrows, diamonds, crosses, double headed arrows and triangles accurately spaced along the length of the rear surface of the larger tool bar 11. Each symbol is used to mark the location of a cultivating tool on the tool bar assembly for a given row spacing. For example, the diamond symbols 25*a* are spaced along the tool bar 11 at intervals which correspond to forty inch crop row spacing. A cultivating tool positioned at each diamond symbol would be located at the proper positions for cultivating in the drill of forty inch crops. In similar manner, the series of crosses 25*b*, arrows 25*c* and other symbols 25*d* indicate the positions for the tools when cultivating in the drills of row crops at thirty-eight inch, thirty-six inch, etc., row spacing. The cultivating tools located between the symbols being used are evenly spaced with respect to each other along the tool bar between those tools located at the tool bar symbols. For example, eight cultivating tools may be located between the cultivating tools aligned with the thirty-six inch spaced arrow symbols.

When the implement has been set for thirty-six inch row spacing and the operator does not wish to cultivate in the drills of the rows of crops which are also spaced at thirty-six inches, the operator lifts and locks the cultivating tools positioned at the arrow symbols. The raised tools ride with the implement, out of contact with the ground and at a height approximately level with the tool bar assembly so as to clear the growing crop. The remaining cultivating tools will rotatably engage the soil with a floating action since they swing independently about their pivots 28. The operator may angle the ground engaging tools to throw dirt toward or away from its adjacent crop row, and each ground engaging tool may be angled independently from the others. For example, the ground engaging tools next adjacent the drill line of the crop row may be angled at five degrees to throw dirt and weeds away from the drill line while the next outward ground engaging tools can be angled more than or in the opposite direction from the inner ground engaging tools to be more aggressive or to throw the dirt in the opposite direction.

The foregoing description of the preferred embodiment of the present invention has been by way of example, and it will be obvious to those skilled in the art that other embodiments of this invention are possible within the scope of the claims appended hereto.

What we claim is:

1. In a cultivator including an elongated tool bar extending generally transverse to the normal direction of travel of the cultivator, at least one cultivating element mounted from a longitudinally extending tool support arm, the combination therewith of:
    (a) connector means for connecting said tool support arm to said tool bar comprising a pair of jaw members disposed to clamp about the tool bar,
    (b) adjustable closing means associated with said pair of jaw members for selectively providing engagement of said pair of jaw members with said tool bar,
    (c) pivot means joining said tool support arm to said pair of jaw members for movement about a transverse axis,
    (d) latching means comprising a locking post extending from said pair of jaw members,
    (e) said locking post comprising the upper end of a shaft extending through said pair of jaw members,
    (f) means for securing said pivot means to said shaft, and
    (g) a spring mounted on said tool support arm constructed and arranged to engage said locking post when said tool support arm is raised thereby to hold the tool support arm in raised, non-working position.

* * * * *